United States Patent [19]
Knoedl, Jr.

[11] Patent Number: 5,918,185
[45] Date of Patent: Jun. 29, 1999

[54] TELECOMMUNICATIONS TERMINAL FOR NOISY ENVIRONMENTS

[75] Inventor: George Knoedl, Jr., Milford, N.J.

[73] Assignee: Lucent Technologies, Inc., Murray Hill, N.J.

[21] Appl. No.: 08/884,719

[22] Filed: Jun. 30, 1997

[51] Int. Cl.$^6$ .............................. H04M 3/00; H04M 7/00
[52] U.S. Cl. .......................... 455/570; 455/403; 379/392
[58] Field of Search ..................... 455/218, 219, 455/220, 221, 222, 226.4, 78, 79, 80, 569, 570, 212, 116, 126, 35.1; 379/387, 391, 392

[56] References Cited

U.S. PATENT DOCUMENTS

| | | | |
|---|---|---|---|
| 4,558,178 | 12/1985 | Yasuda et al. | 455/567 |
| 5,220,685 | 6/1993 | Bradt et al. | 455/218 |
| 5,835,851 | 11/1998 | Rasmussan et al. | 455/79 |
| 5,852,769 | 12/1998 | Ahmed et al. | 455/116 |

*Primary Examiner*—Reinhard J. Eisenzopf
*Assistant Examiner*—Edan Orgad

[57] ABSTRACT

A wireless terminal is disclosed comprising a first electro-acoustic transducer for converting a first acoustic signal to an uplink signal; a wireless transmitter capable of transmitting the uplink signal to a base station; a wireless receiver capable of receiving a downlink signal from the base station; a terminal processor for conditionally adding a portion of the uplink signal to the downlink signal while a first parameter is set and not adding the portion of the uplink signal to the downlink signal while the first parameter is reset; and a second electro-acoustic transducer for converting the downlink signal to a second acoustic signal. Another embodiment is disclosed that reduces the sidetone level of the terminal based on the power level of the envelope of the acoustic signal input at the microphone.

24 Claims, 6 Drawing Sheets

TELECOMMUNICATIONS TERMINAL FOR NOISY ENVIRONMENTS

FIELD OF THE INVENTION

The present invention relates to telecommunications in general, and, more particularly, to wireless and wireline telecommunications terminals that are adapted for noisy environments.

BACKGROUND OF THE INVENTION

Anyone who has used a telecommunications terminal in an acoustically noisy environment has probably experienced that even with one hand covering one ear and a good seal between the terminal earpiece and the other ear, it can still be difficult to hear.

SUMMARY OF THE INVENTION

Embodiments of the present invention are more suited for use in acoustically noisy environments than terminals in the prior art. These results are found in an illustrative embodiment that comprises the steps of converting a first acoustic signal to an uplink signal with a first electro-acoustic transducer; transmitting the uplink signal to a base station with a wireless transmitter; receiving a downlink signal from the base station with a wireless receiver; adding a portion of the uplink signal to the downlink signal while a first parameter is reset and not adding the portion of the uplink signal to the downlink signal while the first parameter is set; and converting the downlink signal to a second acoustic signal with a second electro-acoustic transducer.

DETAILED DESCRIPTION

For the purposes of this specification, the term "telecommunications terminal" includes a wireless terminal (e.g., a cellular telephone, a cordless telephone, etc.) and a wireline terminal (e.g., a public pay telephone, a non-cordless traditional office or home telephone, etc.) that have the capability of transmitting and receiving voice signals.

One of the principal reasons that it is difficult to use a telecommunications terminal in an acoustically noisy environment has to do with the presence of "sidetone." Sidetone is a portion of an acoustic signal that is collected by the microphone in the mouthpiece of a terminal and that is output through the speaker in the earpiece of the same terminal. Although sidetone occurred naturally in the earliest telephones, it is deliberately introduced into most contemporary terminals because it provides two human factors benefits. First, sidetone is a psycho-acoustic cue to the user that the telecommunications terminal is working. Second, sidetone enables a user to hear his or her voice through the earpiece, which allows the user to moderate the loudness of his or her voice.

An undesirable side-effect of sidetone occurs when the user is in an acoustically noisy environment. The circuitry designed to create sidetone picks up the ambient noise, adds it to the incoming signal and outputs it through the user's earpiece. The result is that the signal-to-noise ratio of the incoming signal is degraded, which makes comprehension difficult under the best of circumstances.

This side-effect of sidetone also explains why increasing the receiver loudness on a terminal doesn't help in noisy environments. Increasing the receiver loudness doesn't increase the signal-to-noise ratio of the incoming signal, but merely increases the energy in the already noisy signal.

A more effective method for using a telecommunications terminal in a noisy environment would be for a user to use one hand to cover one ear and the second hand to both (1) cover the mouthpiece when the user is not talking and (2) ensure a good seal between the terminal earpiece and the other ear. The act of covering the mouthpiece helps to prevent the ambient noise from entering the user's ear as sidetone. Unfortunately, with the hand opposite the handset being more suitably oriented to block the mouthpiece or the other ear, and only one opposite hand, this is physically awkward to do.

Figure 1:
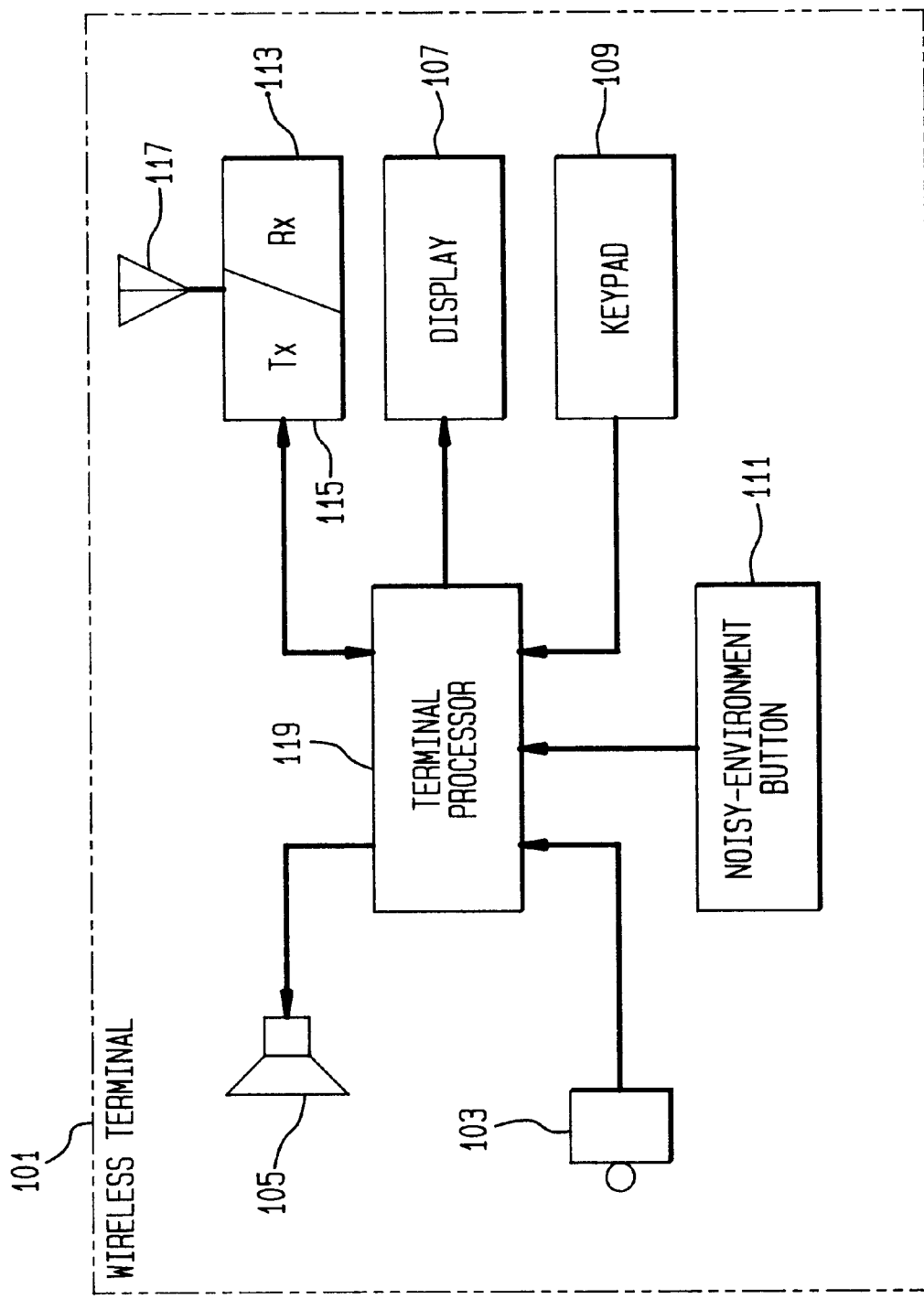
FIG. 1 depicts a block diagram of an illustrative embodiment of the present invention that functions as a wireless terminal.

FIG. 1 depicts a block diagram of an illustrative embodiment of the present invention that operates as a wireless terminal. Wireless terminal 101 advantageously comprises: a first electro-acoustic transducer (e.g., microphone 103), a second electro-acoustic transducer (e.g., speaker 105), visual display 107, keypad 109, noisy-environment button 111, wireless receiver 113, wireless transmitter 115, antenna 117 and terminal processor 119. Microphone 103, speaker 105, visual display 107, keypad 109, wireless receiver 113, wireless transmitter 115 and antenna 117 are all well-known in the art and their details will not be further discussed. Terminal processor 119 is advantageously a general purpose digital processor with associated RAM, ROM, I/O and analog-to-digital converters that is programmed to function as a wireless terminal and to perform the steps depicted in FIG. 2.

Figure 2:
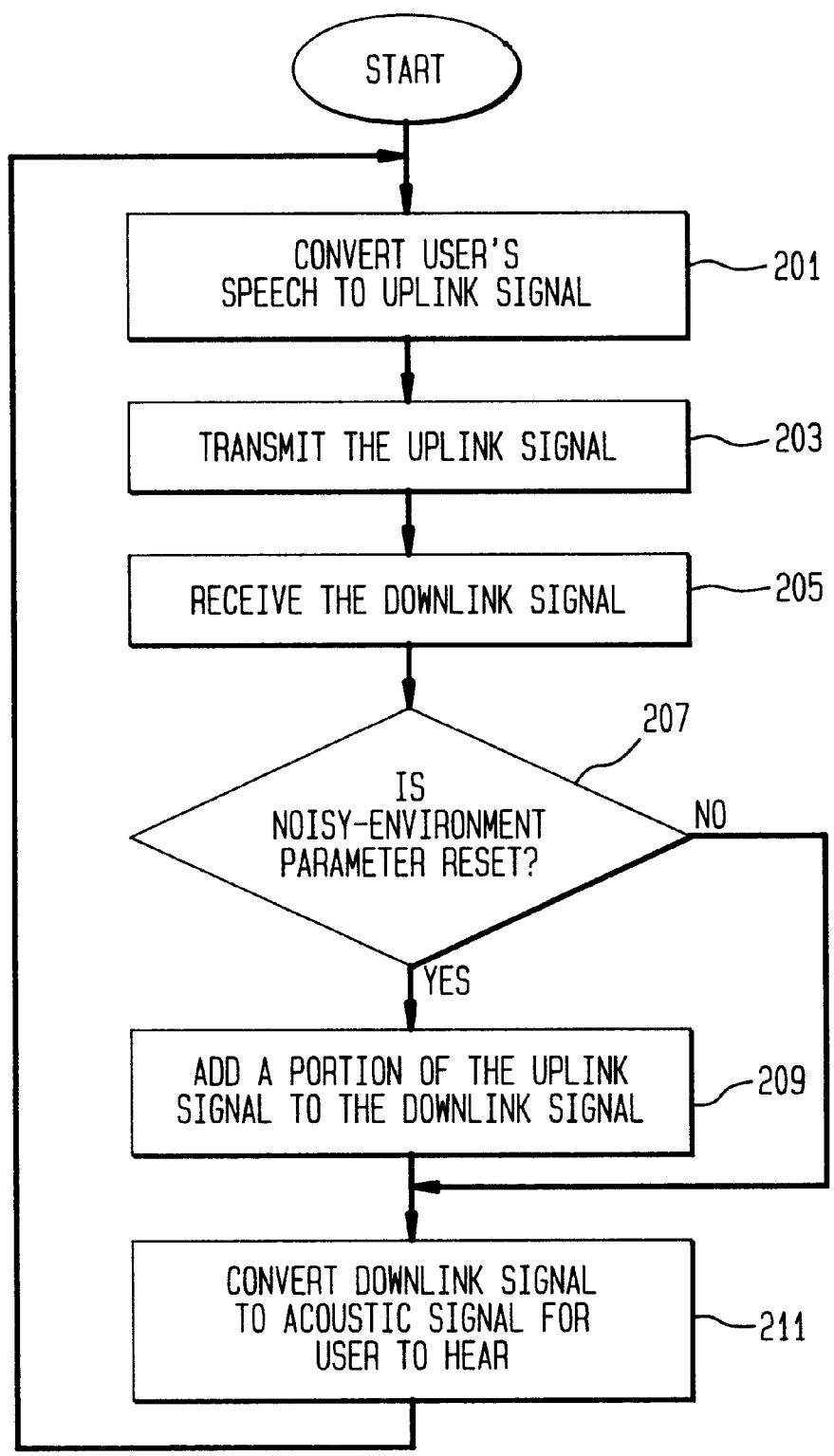
FIG. 2 depicts a flowchart of the operation of the illustrative embodiment shown in FIG. 1.

FIG. 2 depicts a flowchart of the steps performed by the illustrative embodiment depicted in FIG. 1. For pedagogical purposes, the steps in FIG. 2 are depicted sequentially. It will be clear, however, to those skilled in the art how to make and use embodiments of the present invention in which some or all of the steps are performed in parallel.

At step 201, the user's voice, which is an acoustic signal, is converted to an uplink signal with microphone 103. At step 203, the uplink signal passes through terminal processor 119 to wireless transmitter 115 for transmission to a remote base station.

At step 205, wireless receiver 113 receives a downlink signal from the same remote base station and passes the downlink signal to terminal processor 119, in well-known fashion. At step 207, terminal processor 119 determines if the "noisy-environment" parameter is reset. When the noisy-environment parameter is reset, which indicates that the ambient noise level is low, then control passes to step 209. In contrast, when the noisy-environment parameter is set, which indicates that the ambient noise level is high, then control passes to step 211.

At step 209, terminal processor 119 adds a portion of the uplink signal to the downlink signal. The uplink and downlink signals can be either analog or digital signals and it will be clear to those skilled in the art how to add a portion of the uplink signal to the downlink signal to effectuate sidetone, as is well known in the art.

At step 211, terminal processor 119 outputs the downlink signal to speaker 105 for conversion to an acoustic signal that the user can hear.

Advantageously, the noisy-environment parameter is a binary parameter that is represented by a bit in memory and that is set and reset, directly or indirectly, by noisy-environment button 111. Advantageously, noisy-environment button 111 is mounted on the housing (not shown) of wireless terminal 101 in such a manner that it can be conveniently pushed by the user.

It should be made clear that noisy-environment button 111 and the noisy-environment parameter do not function in the same manner as a mute button. A mute button prevents the transmission of the uplink signal and may or may not cut-off the sidetone. In contrast, the noisy-environment button does not affect the transmission of the uplink signal but cuts-off the sidetone.

In one illustrative embodiment, the noisy-environment parameter is set while noisy-environment button 111 is depressed and reset while noisy-environment button 111 is not depressed. According to this embodiment, the sidetone is eliminated when, and only when, the noisy-environment button is depressed by the user.

In another illustrative embodiment, the noisy-environment parameter is reset while noisy-environment button 111 is depressed and set while noisy-environment button 111 is not depressed. According to this embodiment, the sidetone is eliminated when, and only when, the noisy-environment button is not depressed by the user.

According to another illustrative embodiment, the noisy-environment parameter toggles (i.e., is set and reset) each time noisy-environment button 111 is depressed and released. And according to another illustrative embodiment, the noisy-environment parameter is set each time noisy-environment button 111 is depressed and released and the noisy-environment parameter is automatically reset after a specified duration (e.g., 15 seconds) during which noisy-environment button 111 is neither depressed nor released.

Figure 3:
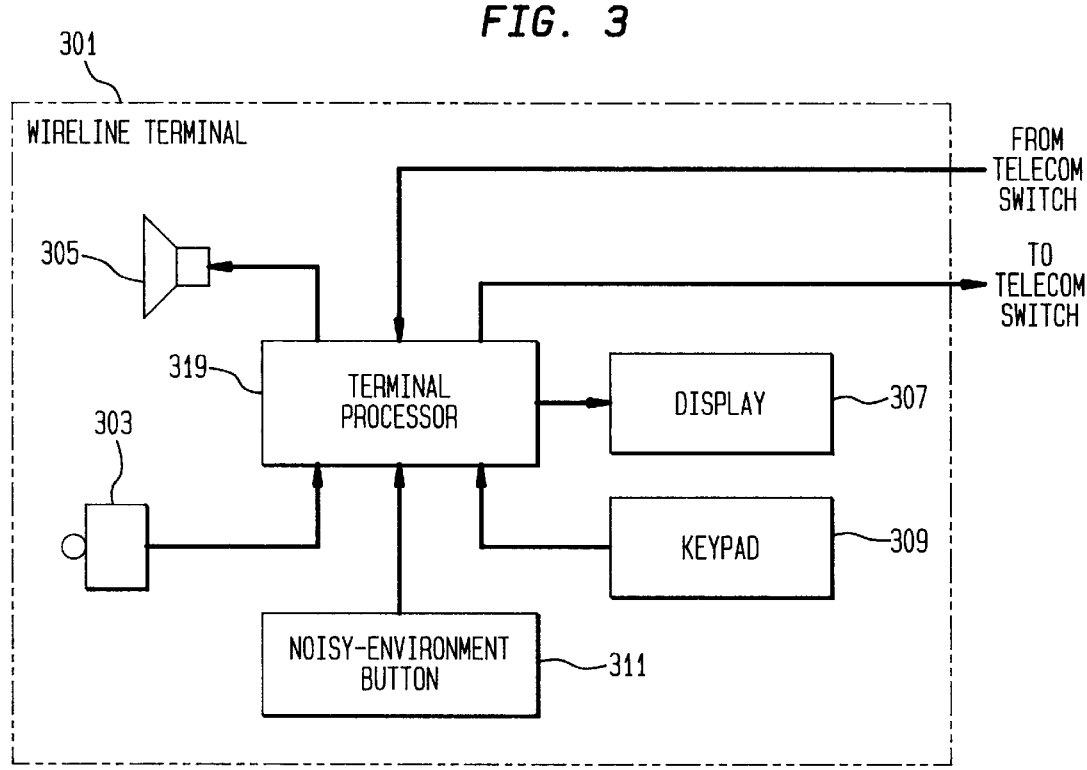
FIG. 3 depicts a block diagram of an illustrative embodiment of the present invention that functions as a wireline terminal.

FIG. 3 depicts a block diagram of an illustrative embodiment of the present invention that operates as a wireline terminal. Wireline terminal 301 advantageously comprises a first electro-acoustic transducer (e.g., microphone 303), a second electro-acoustic transducer 305, visual display 307, keypad 309, noisy-environment button 311 and terminal processor 319.

The wireline terminal of FIG. 3 functions analogously to the wireline terminal of FIG. 1 in all respects with two exceptions. First, the uplink signal is transmitted to a telecommunications switch over a wireline and second the downlink signal is received from the telecommunications switch over a wireline. Some wireline terminals are self-contained in the hand-set, in which case noisy-environment button 311 in also conveniently mounted on the hand-set, while other wireline terminals comprise a handset and an associated base. In such cases, noisy-environment button 311 can be either mounted conveniently on the handset or on the base. It will be clear to those skilled in the art how to make and use embodiments of the present invention that are wireline terminals.

Figure 4:
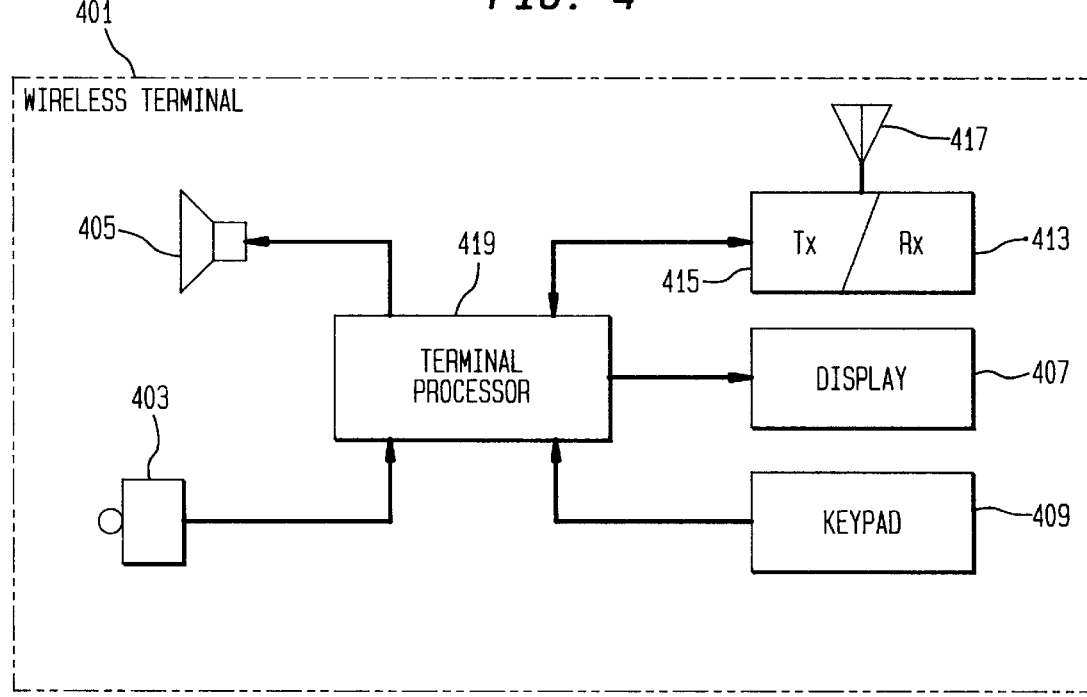
FIG. 4 depicts a block diagram of another illustrative embodiment of the present invention that functions as a wireless terminal.

FIG. 4 depicts a block diagram of yet another illustrative embodiment of the present invention that operates as a wireless terminal.

Wireless terminal 401 advantageously comprises: a first electro-acoustic transducer (e.g., microphone 403), a second electro-acoustic transducer (e.g., speaker 405), visual display 407, keypad 409, wireless receiver 413, wireless transmitter 415, antenna 417 and terminal processor 419. Microphone 403, speaker 405, visual display 407, keypad 409, wireless receiver 413, wireless transmitter 415 and antenna 417 are all well-known in the art and their details will not be further discussed. Terminal processor 419 is advantageously a general purpose digital processor with associated RAM, ROM, I/O and analog-to-digital converters that is programmed to function as a wireless terminal and to perform the steps depicted in FIG. 5.

Figure 5:
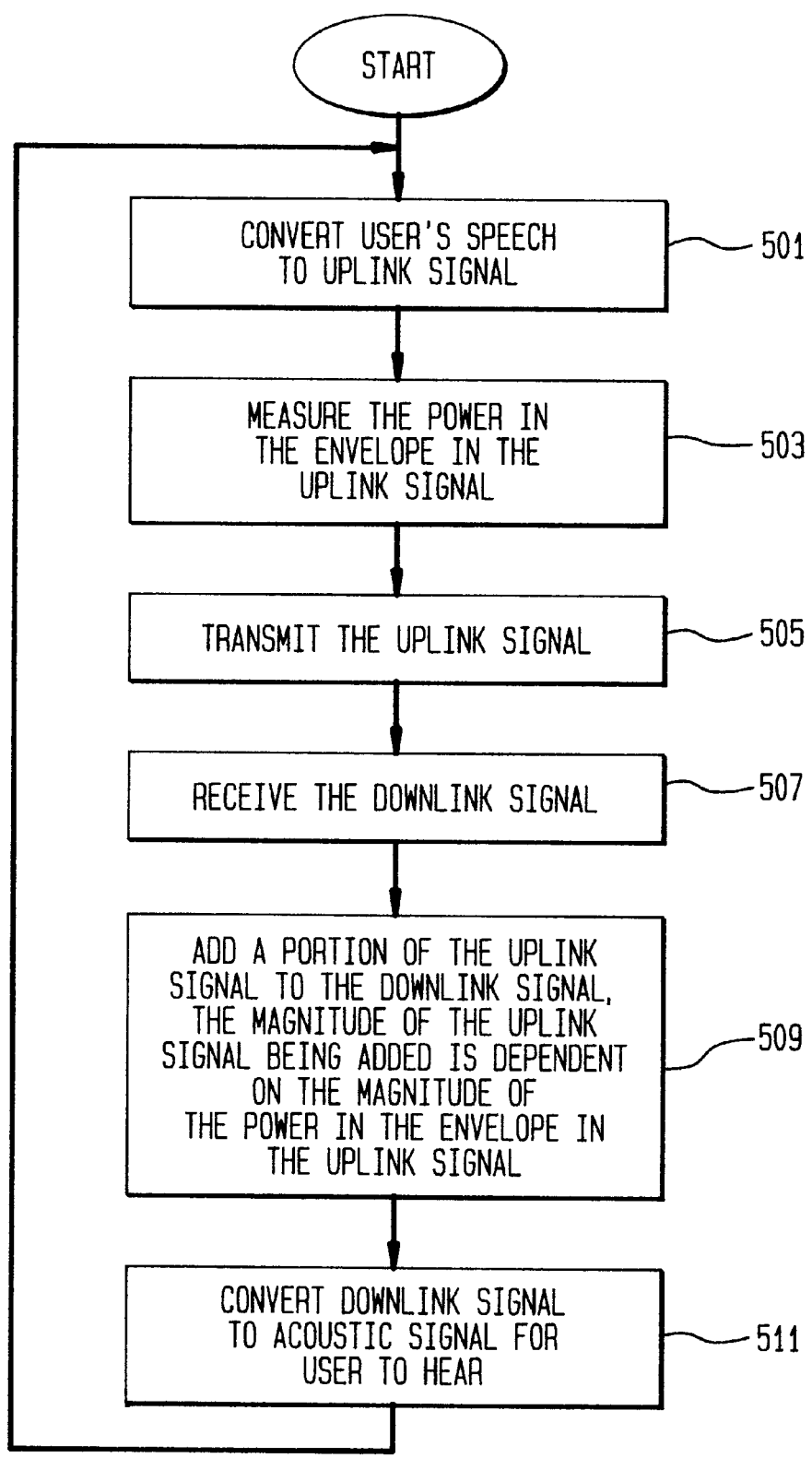
FIG. 5 depicts a flowchart of the operation of the illustrative embodiment shown in FIG. 4.
Figure 8:
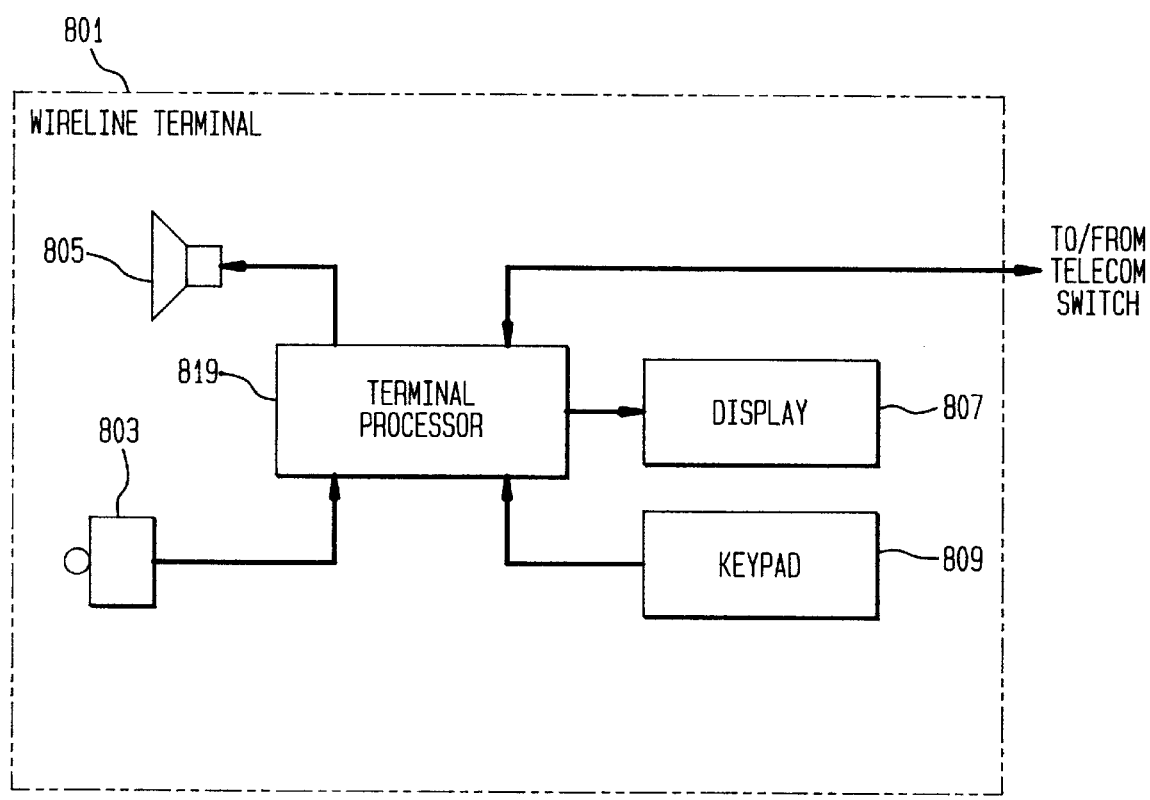
FIG. 8 depicts a block diagram of another illustrative embodiment of the present invention that functions as a wireline terminal.

FIG. 5 depicts a flowchart of the steps performed by an alternative illustrative embodiment, which can either be a wireless terminal as depicted in FIG. 4, or a wireline terminal as depicted in FIG. 8. It will be clear, however, to those skilled in the art how to make and use embodiments of the present invention in which some or all of the steps are performed in parallel.

Figure 6:
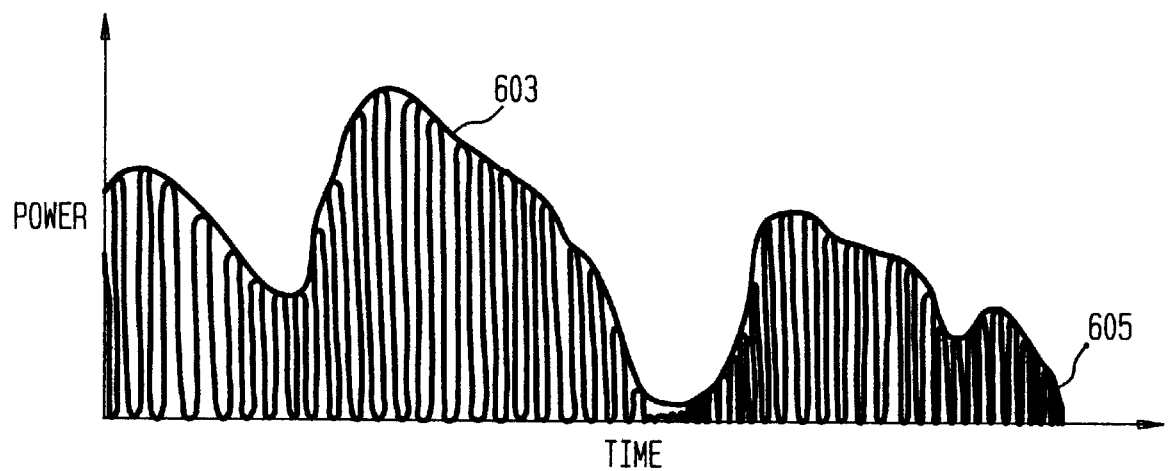
FIG. 6 depicts a graph of the power of the envelope of an acoustic signal.

At step 501, the user's voice, which is an acoustic signal, is converted to an uplink signal with microphone 403. At step 505, terminal processor 419 measures the power in the envelope in the uplink signal in well-known fashion. Because the uplink signal is based on an acoustic signal, its power fluctuates rapidly (as indicated by line 605 in FIG. 6). The average peak power, however, defines the envelope (as shown by line 603 in FIG. 6).

Figure 7:
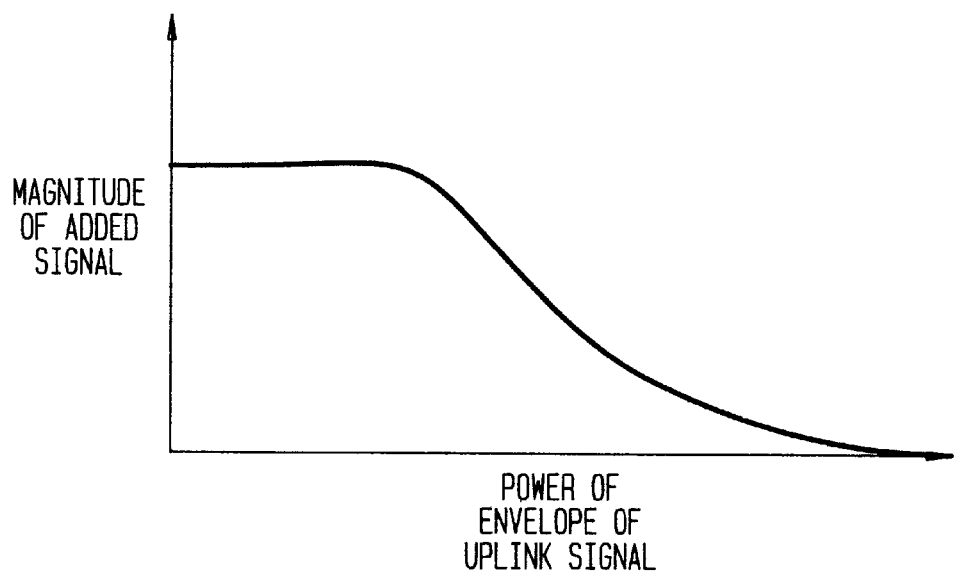
FIG. 7 depicts an illustrative graph of the magnitude of the added signal as a function of the power in the envelope of the uplink signal.

At step 505, the uplink signal passes through terminal processor 419 to wireless transmitter 415 for transmission to a remote base station. At step 507, wireless receiver 413 receives a downlink signal from the same remote base station and passes the downlink signal to terminal processor 419, in well-known fashion. At step 509, terminal processor 419 adds a portion of the uplink signal to the downlink signal to create the sidetone. But to prevent the sidetone from harmfully degrading the signal-to-noise ratio of the downlink signal, terminal processor 419 attenuates the magnitude of the uplink signal added to the downlink signal as the power increases in the envelope of the uplink signal. For example, FIG. 7 depicts an illustrative graph of how the magnitude of the added uplink signal varies inversely with the power in the envelope of the uplink signal. It will be clear to those skilled in the art how to make and use embodiments of the present invention that vary the magnitude of the added uplink signal as a different function of the power in the envelope of the uplink signal, whether terminal processor 419 employs digital or analog circuitry.

At step 511, terminal processor 419 transmits the downlink signal to speaker 405, which converts it to an acoustic signal for the user to hear.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. A method of operating a wireless terminal comprising:
converting a first acoustic signal to an uplink signal with a first electro-acoustic transducer;
transmitting said uplink signal to a base station with a wireless transmitter;
receiving a downlink signal from said base station with a wireless receiver;
adding a portion of said uplink signal to said downlink signal while a first parameter is reset and not adding said portion of said uplink signal to said downlink signal while said first parameter is set; and
converting said downlink signal to a second acoustic signal with a second electro-acoustic transducer.

2. The method of claim 1 wherein said first parameter is set while a first button on said wireless terminal is depressed and wherein said first parameter is reset while said first button on said wireless terminal is not depressed.

3. The method of claim 1 wherein said first parameter is set while a first button on said wireless terminal is not depressed and wherein said first parameter is reset while said first button on said wireless terminal is depressed.

4. The method of claim 1 wherein said first parameter is set by depressing and releasing a first button on said wireless terminal once and said first parameter is reset by depressing and releasing said first button a second time.

5. The method of claim 1 wherein said first parameter is set for a limited amount of time by depressing and releasing a first button on said wireless terminal.

6. A wireless terminal comprising:
a first electro-acoustic transducer for converting a first acoustic signal to an uplink signal;
a wireless transmitter capable of transmitting said uplink signal to a base station;
a wireless receiver capable of receiving a downlink signal from said base station;
a terminal processor for adding a portion of said uplink signal to said downlink signal while a first parameter is set and not adding said portion of said uplink signal to said downlink signal while said first parameter is reset; and
a second electro-acoustic transducer for converting said downlink signal to a second acoustic signal.

7. The wireless terminal of claim 6 wherein said first parameter is set while a first button on said wireless terminal is depressed and wherein said first parameter is reset while said first button on said wireless terminal is not depressed.

8. The wireless terminal of claim 6 wherein said first parameter is set while a first button on said wireless terminal is not depressed and wherein said first parameter is reset while said first button on said wireless terminal is depressed.

9. The wireless terminal of claim 6 wherein said first parameter is set by depressing and releasing a first button on said wireless terminal once and said first parameter is reset by depressing and releasing said first button a second time.

10. The wireless terminal of claim 6 wherein said first parameter is set for a limited amount of time by depressing and releasing a first button on said wireless terminal.

11. A method of operating a wireline terminal comprising:
converting a first acoustic signal to an uplink signal with a first electro-acoustic transducer;
transmitting said uplink signal to a telecommunications switch;
receiving a downlink signal from said telecommunications switch;
adding a portion of said uplink signal to said downlink signal while a first parameter is set and not adding said portion of said uplink signal to said downlink signal while said first parameter is reset; and
converting said downlink signal to a second acoustic signal with a second electro-acoustic transducer.

12. The method of claim 11 wherein said first parameter is set while a first button on said wireline terminal is depressed and wherein said first parameter is reset while said first button on said wireline terminal is not depressed.

13. The method of claim 11 wherein said first parameter is set while a first button on said wireline terminal is not depressed and wherein said first parameter is reset while said first button on said wireline terminal is depressed.

14. The method of claim 11 wherein said first parameter is set by depressing and releasing a first button on said wireline terminal once and said first parameter is reset by depressing and releasing said first button a second time.

15. The method of claim 11 wherein said first parameter is set for a limited amount of time by depressing and releasing a first button on said wireline terminal.

16. A wireline terminal comprising:
a first electro-acoustic transducer for converting a first acoustic signal to an uplink signal;
a transmitter capable of transmitting said uplink signal to a telecommunications switch;
a receiver capable of receiving a downlink signal from said telecommunications switch;
a terminal processor for adding a portion of said uplink signal to said downlink signal while a first parameter is set and not adding said portion of said uplink signal to said downlink signal while said first parameter is reset; and
a second electro-acoustic transducer for converting said downlink signal to a second acoustic signal.

17. The wireless terminal of claim 16 wherein said first parameter is set while a first button on said wireline terminal is depressed and wherein said first parameter is reset while said first button on said wireline terminal is not depressed.

18. The wireless terminal of claim 16 wherein said first parameter is set while a first button on said wireline terminal is not depressed and wherein said first parameter is reset while said first button on said wireline terminal is depressed.

19. The wireless terminal of claim 16 wherein said first parameter is set by depressing and releasing a first button on said wireline terminal once and said first parameter is reset by depressing and releasing said first button a second time.

20. The wireless terminal of claim 16 wherein said first parameter is set for a limited amount of time by depressing and releasing a first button on said wireline terminal.

21. A method of operating a wireless terminal comprising:
converting a first acoustic signal to an uplink signal with a first electro-acoustic transducer;
measuring the power in the envelope in said uplink signal;
transmitting said uplink signal to a base station with a wireless transmitter;
receiving a downlink signal from said base station with a wireless receiver;
adding a portion of said uplink signal to said downlink signal, the magnitude of said portion being based on the power in the envelope in said uplink signal; and
converting said downlink signal to a second acoustic signal with a second electro-acoustic transducer.

22. The method of claim 21 wherein the magnitude of said portion varies inversely with the power in the envelope in said uplink signal.

23. A wireless terminal comprising:
a first electro-acoustic transducer for converting a first acoustic signal to an uplink signal;
a wireless transmitter capable of transmitting said uplink signal to a base station;
a wireless receiver capable of receiving a downlink signal from said base station;
a terminal processor for measuring the power in the envelope in said uplink signal, and for adding a portion of said uplink signal to said downlink signal, the magnitude of said portion being based on the power in the envelope in said uplink signal; and
a second electro-acoustic transducer for converting said downlink signal to a second acoustic signal.

24. The wireless terminal of claim 23 wherein the magnitude of said portion varies inversely with the power in the envelope in said uplink signal.

* * * * *